(12) United States Patent
Kojima

(10) Patent No.: US 12,135,251 B2
(45) Date of Patent: Nov. 5, 2024

(54) PIEZOELECTRIC ELEMENT DEVICE, PIEZOELECTRIC ELEMENT APPARATUS, AND LOAD DETECTION METHOD

(71) Applicant: SEIKO EPSON CORPORATION, Tokyo (JP)

(72) Inventor: Chikara Kojima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 706 days.

(21) Appl. No.: 17/363,400

(22) Filed: Jun. 30, 2021

(65) Prior Publication Data

US 2021/0404889 A1 Dec. 30, 2021

(30) Foreign Application Priority Data

Jun. 30, 2020 (JP) ................................. 2020-112700

(51) Int. Cl.
*G01L 1/16* (2006.01)
*B25J 13/08* (2006.01)
*G01L 1/10* (2006.01)

(52) U.S. Cl.
CPC .............. *G01L 1/167* (2013.01); *G01L 1/106* (2013.01); *B25J 13/084* (2013.01)

(58) Field of Classification Search
CPC .... H10N 30/304; H10N 30/302; H10N 30/50; B25J 13/084; G01L 1/106; G01L 1/167
See application file for complete search history.

(56) References Cited

U.S. PATENT DOCUMENTS 5,760,530 A * 6/1998 Kolesar .................. H10N 39/00
310/317
2011/0301876 A1 12/2011 Yamashita
(Continued)

FOREIGN PATENT DOCUMENTS

| JP | 2010286254 A | 12/2010 |
| JP | 2012141255 A | 7/2012 |
| WO | 2010095573 A1 | 8/2010 |

*Primary Examiner* — J. San Martin
(74) *Attorney, Agent, or Firm* — CHIP LAW GROUP

(57) ABSTRACT

A piezoelectric element device includes: a substrate including a plurality of vibrating portions having a first vibrating portion and a second vibrating portion; a piezoelectric element group in which a plurality of piezoelectric elements having a first piezoelectric element and a second piezoelectric element provided in the plurality of vibrating portions are coupled in parallel to each other; a plurality of load detectors having a first load detector including the first vibrating portion and the first piezoelectric element provided in the first vibrating portion and a second load detector including the second vibrating portion and the second piezoelectric element provided in the second vibrating portion; and a resin layer covering the piezoelectric element group. The first load detector resonates at a first resonance frequency, the second load detector resonates at a second resonance frequency, the first resonance frequency and the second resonance frequency are different from each other, the first resonance frequency changes in accordance with a load applied to the first load detectors via the resin layer, the second resonance frequency changes in accordance with a load applied to the second load detectors via the resin layer, and a first resonance frequency change range, which are changeable range of the first resonance frequency, and a second resonance frequency change range, which are changeable range of the second resonance frequency, do not overlap each other.

7 Claims, 12 Drawing Sheets

(56) References Cited

U.S. PATENT DOCUMENTS

| | | | |
|---|---|---|---|
| 2015/0258573 A1* | 9/2015 | Kojima | B06B 1/0622 |
| | | | 310/327 |
| 2019/0305208 A1* | 10/2019 | Ohashi | H10N 30/302 |
| 2020/0295251 A1* | 9/2020 | Kojima | H10N 30/706 |
| 2021/0162463 A1* | 6/2021 | Kojima | B06B 1/0629 |

\* cited by examiner

*FIG. 3*
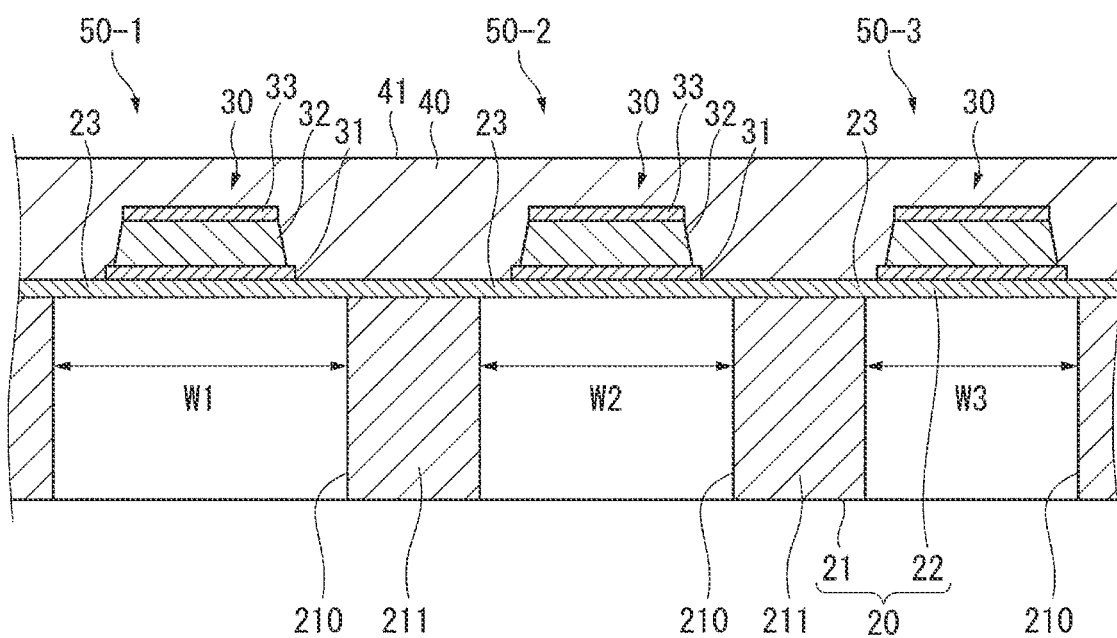
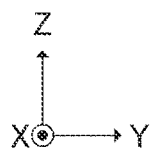

PIEZOELECTRIC ELEMENT DEVICE, PIEZOELECTRIC ELEMENT APPARATUS, AND LOAD DETECTION METHOD

The present application is based on, and claims priority from JP Application Serial Number 2020-112700, filed Jun. 30, 2020, the disclosure of which is hereby incorporated by reference herein in its entirety.

BACKGROUND

1. Technical Field

The present disclosure relates to a piezoelectric element device, a piezoelectric element apparatus, and a load detection method.

2. Related Art

In related art, a piezoelectric element device including a plurality of piezoelectric elements is used as a tactile sensor that detects a load.

For example, a tactile sensor disclosed in JP-A-2012-141255 includes a sensor main body as a piezoelectric element device, and the sensor main body includes a substrate, a plurality of ultrasonic elements disposed on the substrate, and an elastic film covering the plurality of ultrasonic elements. In the sensor main body, the ultrasonic element including piezoelectric elements transmits an ultrasonic wave to a reflector provided in the elastic film, and receives the ultrasonic wave reflected by the reflector. In the tactile sensor, a change in a distance from each ultrasonic element to the reflector can be detected by measuring a time from an ultrasonic wave transmission timing to an ultrasonic wave reception timing, and stress acting on the elastic film can be calculated based on the change in the distance.

However, in the piezoelectric element device disclosed in JP-A-2012-141255 described above, in order to detect the change in the distance from each ultrasonic element disposed on the substrate to the reflector, it is necessary to couple individual wirings to the piezoelectric elements constituting each ultrasonic element. In such a piezoelectric element device, a space for providing the wiring between the piezoelectric elements on the substrate is required, and thus it is difficult to dispose the piezoelectric elements at a high density. This makes it difficult to improve resolution of a piezoelectric element apparatus using a piezoelectric element device such as a tactile sensor.

SUMMARY

A piezoelectric element device according to an application example of the present disclosure includes: a substrate including a plurality of vibrating portions; a piezoelectric element group in which piezoelectric elements provided in the plurality of vibrating portions are coupled in parallel to each other; and a resin layer covering the piezoelectric element group, in which load detectors individually including a vibrating portion and a piezoelectric element provided in the vibrating portion resonate at resonance frequencies different from each other, the resonance frequencies change in accordance with a load applied to the load detectors via the resin layer, and resonance frequency change ranges, which are changeable ranges of the resonance frequencies, do not overlap each other.

A piezoelectric element apparatus according to an application example of the present disclosure includes: the piezoelectric element device described above; and a resonance frequency detector configured to detect a change in the resonance frequency for each of the load detector based on a detection signal output from the piezoelectric element group due to vibration of the load detectors.

A load detection method according to an application example of the present disclosure includes: by using a piezoelectric element device including a substrate including a plurality of vibrating portions, a piezoelectric element group in which piezoelectric elements provided in the plurality of vibrating portions are coupled in parallel to each other, and a resin layer covering the piezoelectric element group, in which load detectors individually including a vibrating portion and a piezoelectric element provided in the vibrating portion resonate at resonance frequencies different from each other, the resonance frequencies of the load detectors change in accordance with a load applied to the load detectors via the resin layer, and resonance frequency change ranges, which are changeable ranges of the resonance frequencies, do not overlap each other, a resonance frequency detection step of detecting a change in the resonance frequency for each of the load detectors based on a detection signal output from the piezoelectric element group due to vibration of the load detectors; and a load calculation step of calculating, based on the change in the resonance frequency for each of the load detectors detected in the resonance frequency detection step, the load applied to the load detector.

BRIEF DESCRIPTION OF THE DRAWINGS

FIG. 3 is a cross-sectional view schematically showing a load detector taken along a line A-A in FIG. 2.

DESCRIPTION OF EXEMPLARY EMBODIMENTS

First Embodiment

Hereinafter, a first embodiment of the present disclosure will be described.

Figure 1:
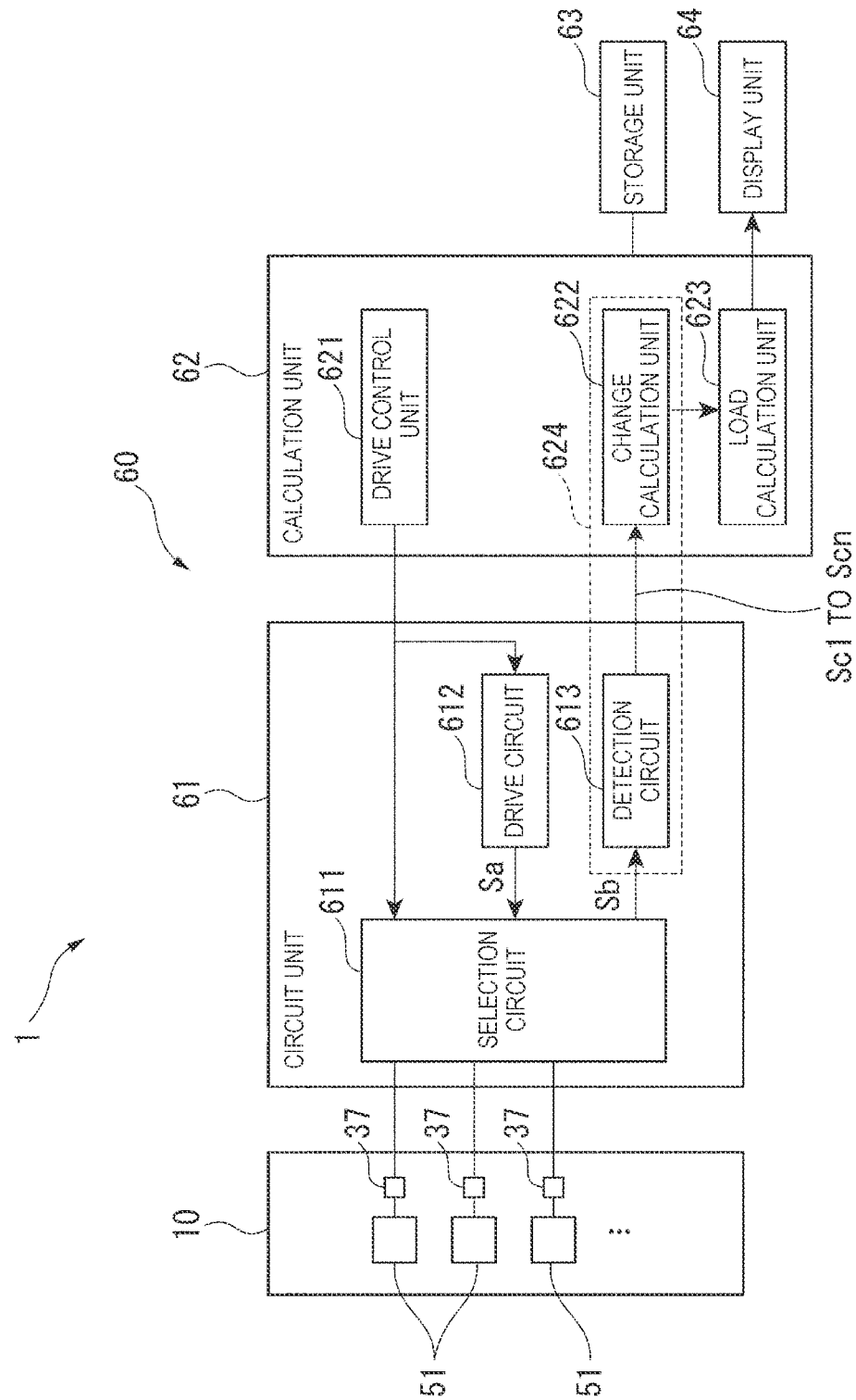
FIG. 1 is a block diagram showing a schematic configuration of a tactile sensor according to a first embodiment.

FIG. 1 is a diagram showing a schematic configuration of a tactile sensor 1 according to the present embodiment. As shown in FIG. 1, the tactile sensor 1 according to the present embodiment is a piezoelectric element apparatus that includes a piezoelectric element device 10 and a control device 60 that controls the piezoelectric element device 10, and detects a distribution of a load applied to a contact surface provided on the piezoelectric element device 10.

Configuration of Piezoelectric Element Device 10

Figure 2:
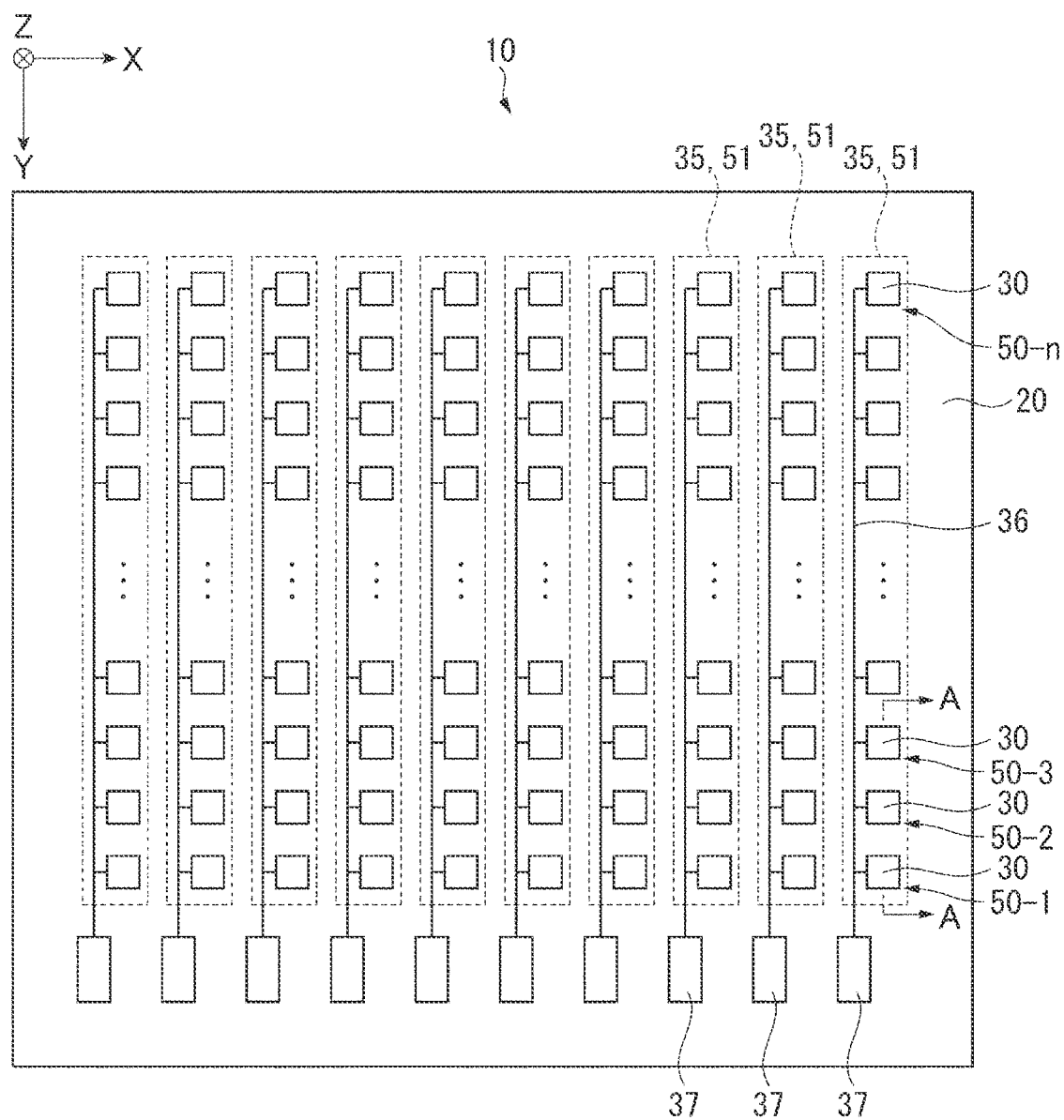
FIG. 2 is a plan view showing a schematic configuration of a piezoelectric element device according to the first embodiment.

FIG. 2 is a plan view showing a schematic configuration of the piezoelectric element device 10, and FIG. 3 is a cross-sectional view of the piezoelectric element device 10 taken along a line A-A in FIG. 2.

As shown in FIG. 2, the piezoelectric element device 10 according to the present embodiment includes a plurality of load detector groups 51, and each of the load detector groups 51 includes a plurality of (n) load detectors 50-1 to 50-n. Each of the load detectors 50-1 to 50-n includes a piezoelectric element 30, and the piezoelectric elements 30 of the load detectors 50-1 to 50-n included in the load detector group 51 are coupled in parallel to each other. That is, the load detector group 51 includes a piezoelectric element group 35 in which a plurality of (n) piezoelectric elements 30 are coupled in parallel to each other.

The number of load detector groups 51, that is, the number of piezoelectric element groups 35 is not limited to the example shown in FIGS. 2 and 3. The piezoelectric element device 10 may include at least one piezoelectric element group 35 and the load detector group 51 including the piezoelectric element group 35. The number of load detectors 50-1 to 50-n included in each load detector group 51, that is, the number of piezoelectric elements 30 included in the piezoelectric element group 35 can be set to any plural number.

In addition, a disposition of the load detectors 50-1 to 50-n is not limited to a disposition of the load detectors 50-1 to 50-n in a line as shown in FIG. 2, and the load detectors 50-1 to 50-n may be disposed in an array.

Hereinafter, a specific configuration of the piezoelectric element device 10 will be described. Hereinafter, the load detectors 50-1 to 50-n may be collectively referred to as a load detector 50.

As shown in FIGS. 2 and 3, the piezoelectric element device 10 includes a substrate 20, the plurality of (n) piezoelectric elements 30 disposed on the substrate 20, and a resin layer 40 that covers the plurality of piezoelectric elements 30. The resin layer 40 is not shown in FIG. 2.

In the following description, a thickness direction of the substrate 20 is referred to as a Z direction. A direction orthogonal to the Z direction is defined as an X direction, and a direction orthogonal to the X direction and the Z direction is defined as a Y direction.

As shown in FIG. 3, the substrate 20 includes a substrate main body 21 and a vibrating plate 22 provided on one surface side of the substrate main body 21.

The substrate main body 21 is a member that supports the vibrating plate 22, and is formed of a semiconductor substrate of Si or the like.

The substrate main body 21 is provided with a plurality of openings 210 penetrating the substrate main body 21 along the Z direction. The plurality of openings 210 are disposed in a two-dimensional array along the X direction and the Y direction with respect to the substrate main body 21. Thus, in the substrate main body 21, a wall portion 211 is provided between the openings 210 adjacent to each other in the X direction and the Y direction.

The vibrating plate 22 is formed of, for example, a laminate of $SiO_2$ and $ZrO_2$. The vibrating plate 22 is supported by the substrate main body 21 and closes one side (Z direction-side) of the opening 210 in the Z direction. In the vibrating plate 22, a region overlapping the opening 210 when viewed from the Z direction, that is, a region surrounded by an edge of the wall portion 211 of the substrate 20 constitutes a vibrating portion 23.

The piezoelectric element 30 is provided in each of a plurality of vibrating portions 23. Thus, the plurality of piezoelectric elements 30 are disposed in a two-dimensional array along the X direction and the Y direction on the substrate 20.

The piezoelectric element 30 is a deflection-type vibrating element that vibrates the vibrating portion 23, and is configured by laminating a lower electrode 31, a piezoelectric film 32, and an upper electrode 33 in order on a surface of the vibrating portion 23 on the Z direction-side.

The lower electrode 31 and the upper electrode 33, which constitute the piezoelectric element 30, are each electrically coupled to a circuit unit 61 via an individual signal line or the like (see FIG. 1).

In the present embodiment, the vibrating portion 23 formed on the substrate 20 and the piezoelectric element 30 disposed on the vibrating portion 23 constitute a load detector 50.

The resin layer 40 is formed on the substrate 20 on the Z direction-side, and covers the plurality of piezoelectric elements 30 on the substrate 20. The resin layer 40 forms a contact surface 41 substantially perpendicular to the Z direction. In the present embodiment, an object to be detected comes into contact with the contact surface 41 of the resin layer 40 and applies a load, so that the load is transmitted to each load detector 50 via the resin layer 40.

In the piezoelectric element device 10, as described above, the plurality of (n) piezoelectric elements 30 are coupled in parallel to each other to form one piezoelectric element group 35 (see FIG. 2). In the piezoelectric element group 35, upper electrodes 33 of the piezoelectric elements 30 are coupled in parallel to each other via an individual drive signal line 36, and the drive signal line 36 is coupled to a drive terminal 37 corresponding to the piezoelectric element group 35. The drive terminal 37 is provided, for example, on an outer peripheral portion of the substrate 20.

Although not shown, lower electrodes 31 of the plurality of piezoelectric elements 30 are coupled to a common terminal via a bias signal line.

When a drive signal is input to the drive terminal 37 and a bias signal is input to the common terminal, a piezoelectric element 30 of the piezoelectric element group 35 coupled to the corresponding drive terminal 37 is driven. Specifically, in the piezoelectric element 30, the piezoelectric film 32 expands and contracts when a voltage is applied between the lower electrode 31 and the upper electrode 33. When the piezoelectric film 32 expands and contracts, the vibrating portion 23 vibrates at a resonance frequency corresponding to an opening width of the opening 210 and the like. As a result, the load detector 50 resonates at a resonance frequency corresponding to the load detector 50.

When a voltage is applied to the load detector 50, due to a potential difference between the lower electrode 31 and the upper electrode 33 of the piezoelectric element 30, a current signal corresponding to the potential difference is output from the piezoelectric element 30. When the load detector 50 resonates, an extreme value is generated in a ratio between the potential difference and the current. Accordingly, the piezoelectric element group 35 outputs a detection signal including the current signal of the piezoelectric element 30.

In the present embodiment, the load detectors 50-1 to 50-$n$ included in the load detector group 51 resonate at resonance frequencies different from each other according to the opening width of the opening 210.

For example, in the three load detectors 50-1 to 50-3 shown in FIG. 3, since opening widths W1 to W3 of the respective openings 210 have a relation of W3<W2<W1, resonance frequencies f1 to f3 of the respective load detectors 50-1 to 50-3 have a relation of f1<f2<f3.

The resonance frequency of the load detector 50 varies depending on the load applied to the load detector 50 from the object to be detected as described later. In the present specification, when simply described as a resonance frequency, the resonance frequency means a resonance frequency in a non-load state where the load from the object to be detected is not applied to the load detector 50.

Configuration of Control Device 60

As shown in FIG. 1, the control device 60 includes the circuit unit 61, a calculation unit 62, a storage unit 63, a display unit 64, and the like.

The circuit unit 61 includes a selection circuit 611, a drive circuit 612, and a detection circuit 613.

The selection circuit 611 switches between drive coupling to be coupled to the drive circuit 612 and detection coupling to be coupled to the detection circuit 613 under the control of the calculation unit 62. The selection circuit 611 is sequentially coupled to the plurality of drive terminals 37 of the piezoelectric element device 10 under the control of the calculation unit 62.

When the selection circuit 611 is switched to the drive coupling, the drive circuit 612 is coupled to the drive terminal 37 via the selection circuit 611, and outputs a drive signal Sa to the drive terminal 37. As a result, the drive signal Sa is input to the piezoelectric element group 35 coupled to the drive terminal 37.

When the selection circuit 611 is switched to the detection coupling, the detection circuit 613 is coupled to the drive terminal 37 via the selection circuit 611. At this time, the detection circuit 613 receives an input of a detection signal Sb from the piezoelectric element group 35 via the drive terminal 37, processes the detection signal Sb, and outputs the processed detection signal Sb to the calculation unit 62.

Although not shown, the circuit unit 61 further includes a reference potential circuit that is coupled to the common terminal of the piezoelectric element device 10 and applies a reference potential (for example, 0 V) to the upper electrode 33 of the load detector 50 via the common terminal.

Figure 4:
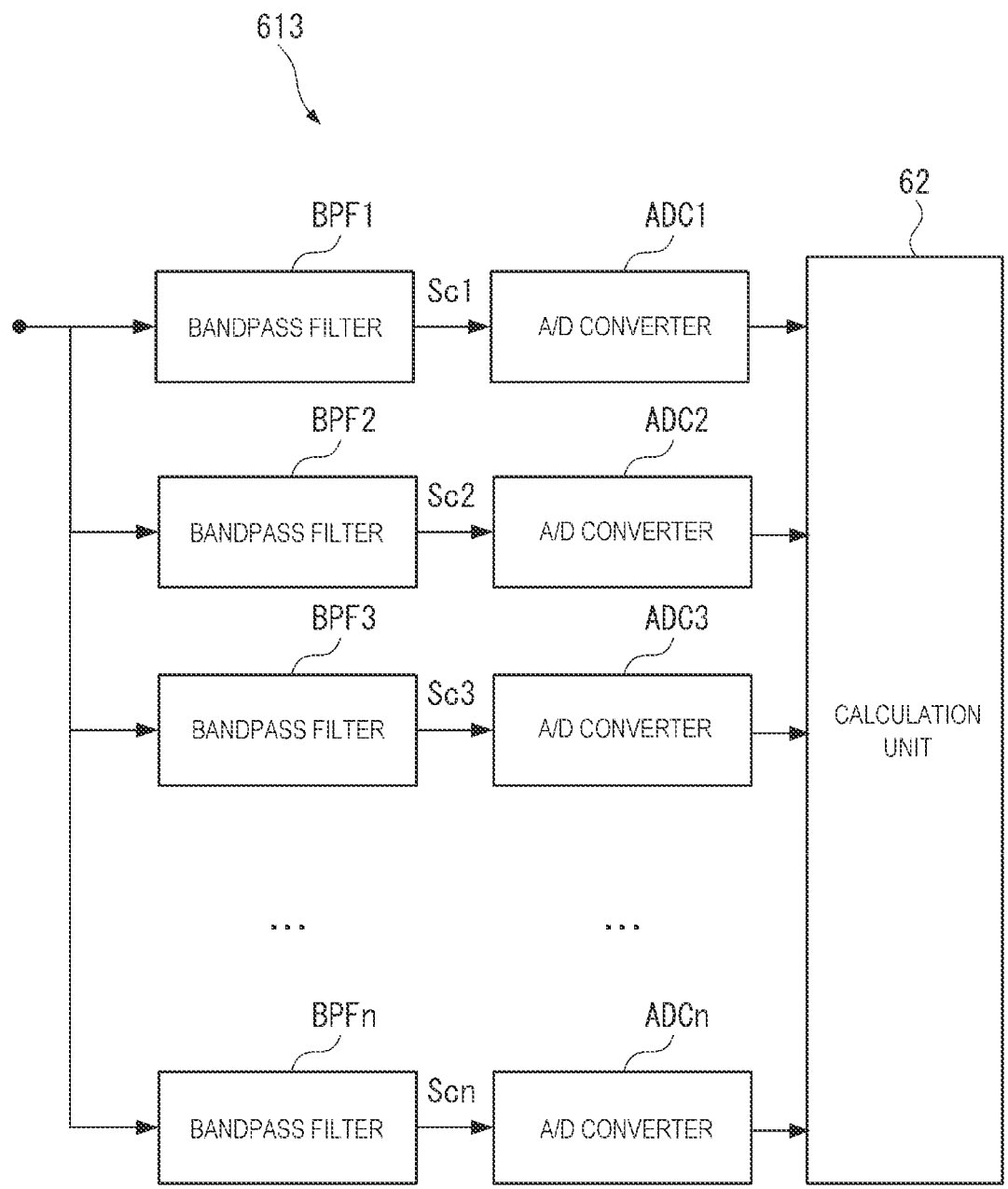
FIG. 4 is a block diagram showing a schematic configuration of a detection circuit according to the first embodiment.

FIG. 4 is a block diagram showing a schematic configuration of the detection circuit 613.

As shown in FIG. 4, the detection circuit 613 includes n bandpass filters BPF1 to BPFn provided corresponding to the n load detectors 50 of the load detector group 51, and n analog-to-digital converters ADC1 to ADCn coupled to the bandpass filters BPF1 to BPFn.

The n bandpass filters BPF1 to BPFn are coupled in parallel to each other, and the detection signal Sb input to the detection circuit 613 is distributed to each of the plurality of bandpass filters BPF1 to BPFn.

Each of the bandpass filters BPF1 to BPFn selectively extracts as an extracted signal Sc1 to Scn, from the detection signal Sb, a signal component contained in the resonance frequency change range of the corresponding load detector 50. That is, respective bandpass filters BPF1 to BPFn pass (extract) the respective resonance frequency change ranges of the corresponding load detectors 50-1 to 50-$n$, and block other signal components.

Specifically, in an example shown in FIG. 4, the bandpass filter BPF1 passes a signal component in a predetermined resonance frequency change range FW1 corresponding to the resonance frequency f1 of the corresponding load detector 50-1.

The bandpass filter BPF2 passes a signal component in a predetermined resonance frequency change range FW2 corresponding to the resonance frequency f2 of the corresponding load detector 50-2.

Similarly, the bandpass filter BPF3 passes a signal component in a predetermined resonance frequency change range FW3 corresponding to the resonance frequency f3 of the corresponding load detector 50-3.

The resonance frequency change ranges FW1 to FW3 are ranges that do not overlap each other. Details of the resonance frequency change ranges FW1 to FW3 will be described later.

The analog-to-digital converters ADC1 to ADCn perform analog-to-digital conversion on the extracted signals Sc1 to Scn that have passed through the bandpass filters BPF1 to BPFn, and output the signals after conversion to the calculation unit 62.

Although not shown in FIG. 4, the detection circuit 613 further includes various circuits that perform signal processing, such as removal of noise components and amplification to a desired signal level, on the input detection signal Sb.

The calculation unit 62 shown in FIG. 1 includes, for example, a calculation circuit such as a processor, for example, a central processing unit (CPU), or a storage circuit such as a memory. The calculation unit 62 functions as a drive control unit 621, a change calculation unit 622, and a load calculation unit 623 by reading and executing various programs stored in the storage unit 63.

The drive control unit 621 controls the selection circuit 611 to switch a coupling destination of the selection circuit 611 between the drive circuit 612 and the detection circuit 613. The drive control unit 621 controls the drive circuit 612 to input the drive signal Sa to each piezoelectric element group 35 of the piezoelectric element device 10 at a predetermined timing.

The change calculation unit 622 calculates a change (for example, a change rate) in the resonance frequency of the load detector 50 in the piezoelectric element device 10 based on a period of each of the extracted signals Sc1 to Scn input from the detection circuit 613. The change calculation unit 622, together with the bandpass filters BPF1 to BPFn in the detection circuit 613, constitutes a resonance frequency detector 624.

The load calculation unit 623 calculates the load applied to each load detector 50 based on the change in the resonance frequency of each load detector 50 calculated by the change calculation unit 622.

The storage unit 63 stores various programs and various data for controlling the tactile sensor 1. For example, information on the resonance frequency of each load detector 50 is stored in the storage unit 63.

The display unit 64 includes, for example, a liquid crystal display, and displays an image.

Change in Resonance Frequency of Load Detector 50

In the piezoelectric element device 10 according to the present embodiment, when the object to be detected comes into contact with the contact surface 41 of the resin layer 40 and applies a load, the load is transmitted to each load detector 50 via the resin layer 40, and the resonance frequency of each load detector 50 changes.

Hereinafter, a relation between the load and the resonance frequency will be described using any load detector 50.

Figure 5:
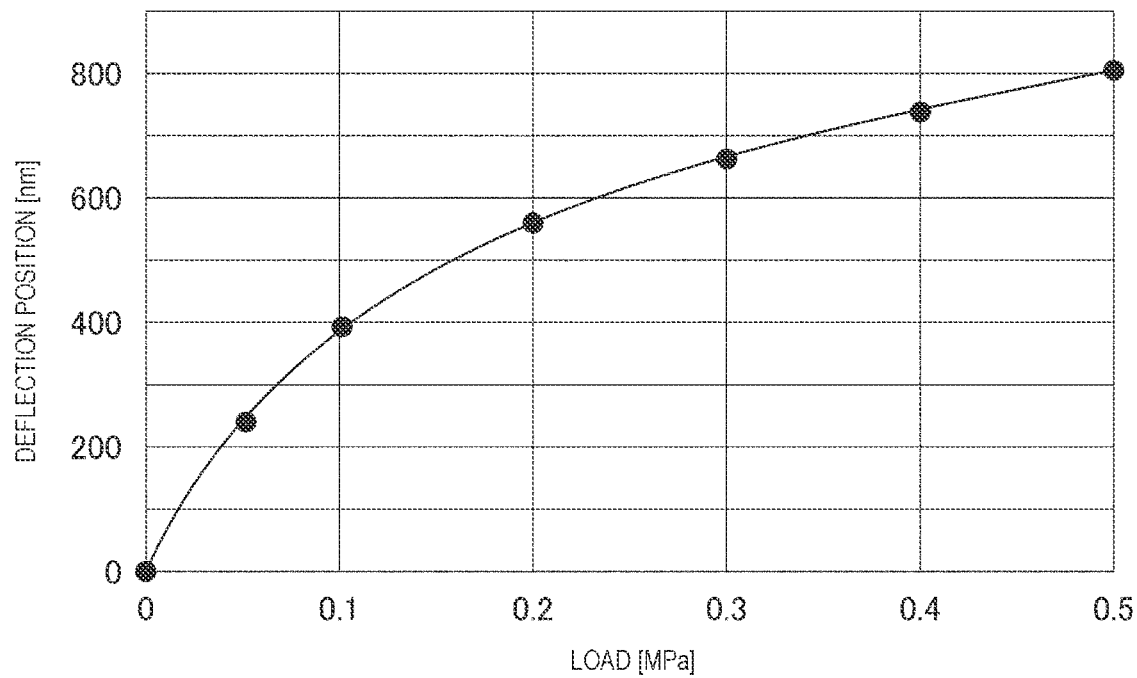
FIG. 5 is a graph showing a relation between a load applied to the load detector and a deflection position of the load detector.
Figure 6:
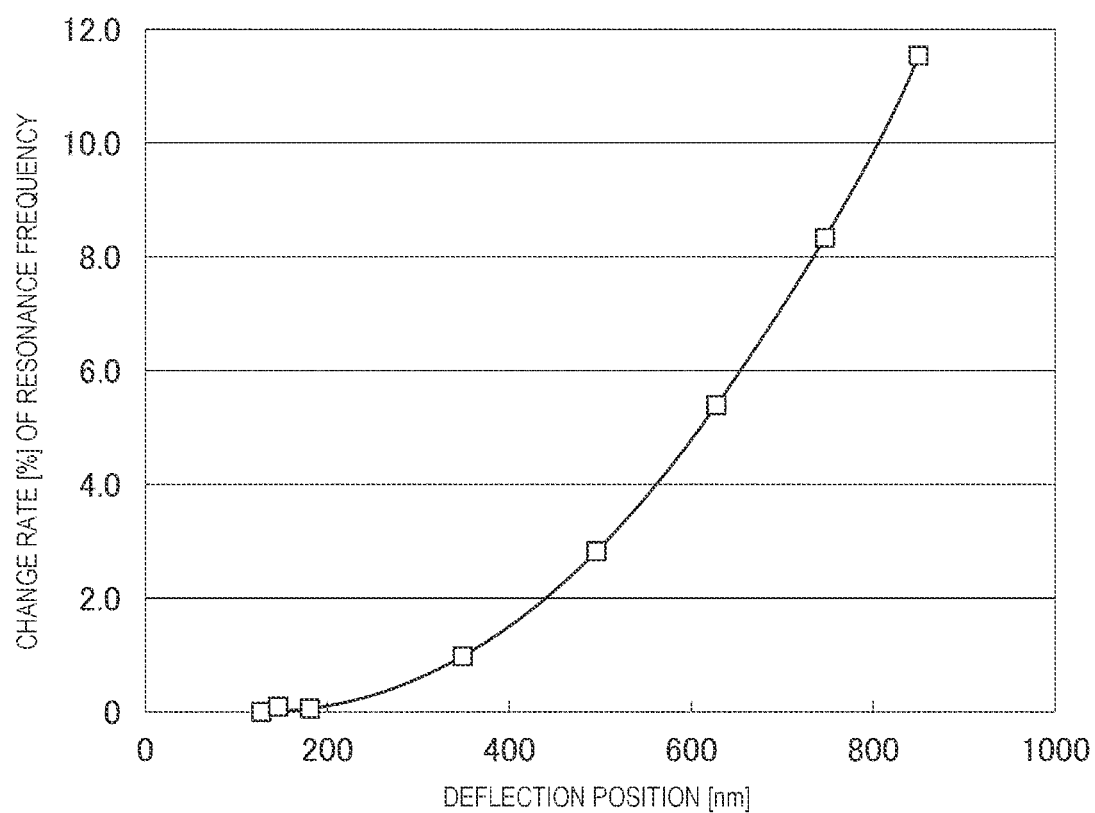
FIG. 6 is a graph showing a relation between the deflection position of the load detector and a change rate of a resonance frequency of the load detector.

FIG. 5 is a graph showing the relation between the load applied to the load detector 50 and a deflection position of the load detector 50. The deflection position of the load detector 50 is an index indicating a degree of deflection of the load detector 50, and is, for example, a position of a central portion of the load detector 50, where the largest deflection occurs, in the Z direction. In FIG. 6, the deflection position in a state where no external load is applied to the load detector 50 (non-load state) is set to "0 nm".

As shown in FIG. 5, as the load applied to the load detector 50 is increased, the deflection position of the load detector 50 is increased logarithmically. The maximum load applied to the load detector 50 is limited to a load that does not damage the load detector 50.

FIG. 6 is a graph showing a relation between the deflection position of the load detector 50 and the change rate of the resonance frequency of the load detector 50.

As shown in FIG. 6, as the deflection position of the load detector 50 is increased, the change rate of the resonance frequency of the load detector 50 is increased exponentially. This is because, as the deflection position of the load detector 50 is increased, a tension applied to the load detector 50 is increased, and a peak point of an amplitude of the load detector 50 with respect to a frequency is shifted in a direction in which the frequency is higher.

According to the above, it can be seen that the change rate of the resonance frequency of the load detector 50 is increased as the load applied to the load detector 50 is increased.

In the present embodiment, it is assumed that the relation between the load and the resonance frequency is obtained for each of the load detectors 50 included in the piezoelectric element group 35 and is stored in the storage unit 63.

Next, the resonance frequency change range of the load detector 50 will be described.

The resonance frequency change range of the load detector 50 corresponds to a frequency range in which the resonance frequency of the load detector 50 can be changed, that is, a frequency range from the resonance frequency of the load detector 50 in a non-load state to the resonance frequency of the load detector 50 in a state where the maximum load is applied.

As described above, the maximum load applied to the load detector 50 is limited to an extent that the load detector 50 is not damaged. In particular, in the present embodiment, it is desirable that the maximum load applied to the load detector 50 is limited to such an extent that ensured detection accuracy of the tactile sensor 1 can be secured.

In the same load detector group 51, the resonance frequency change ranges of the load detectors 50-1 to 50-$n$ do not overlap each other.

Figure 7:
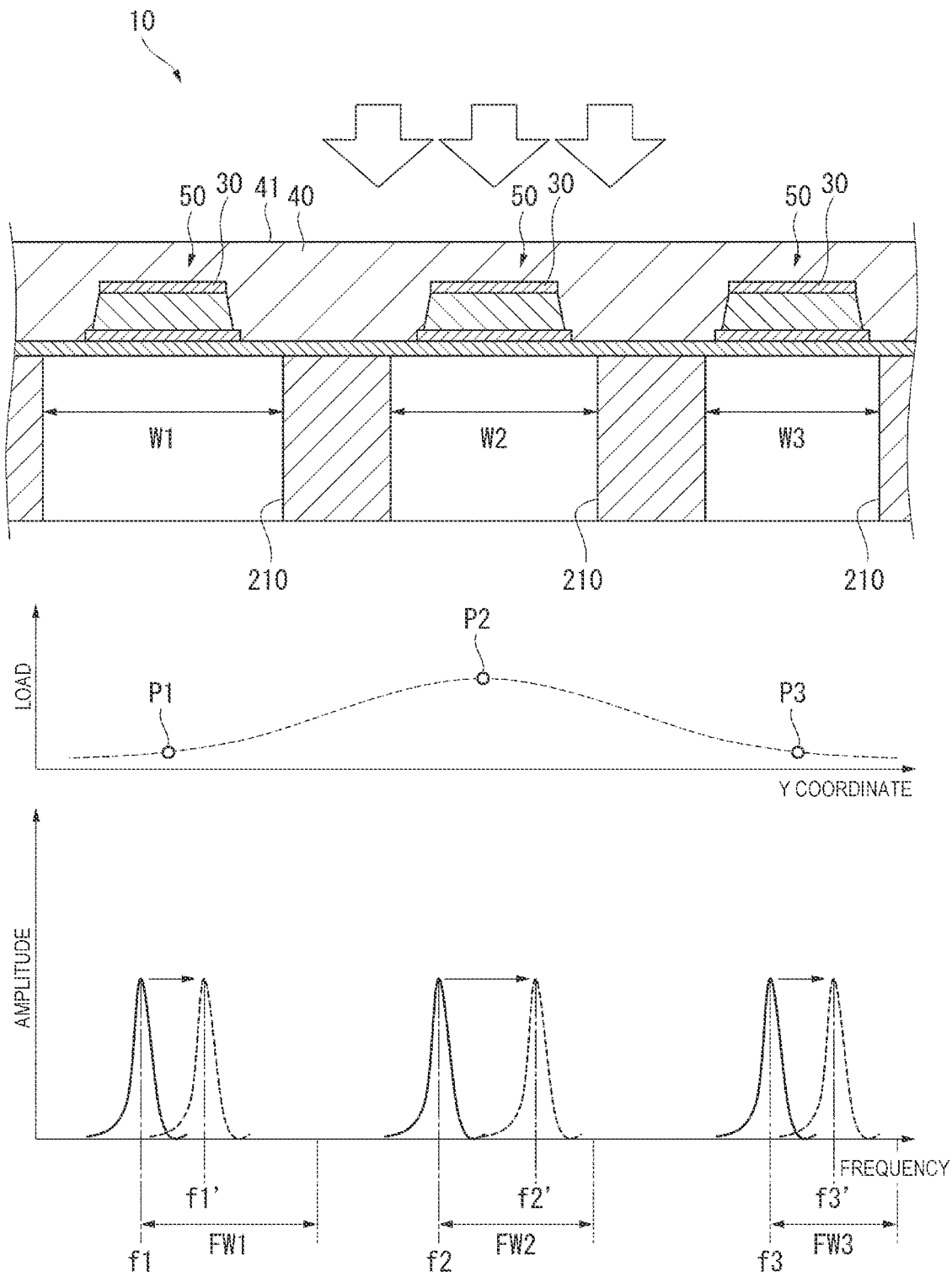
FIG. 7 is a graph illustrating resonance frequencies and resonance frequency change ranges for a plurality of load detectors according to the first embodiment.

For example, the three load detectors 50-1 to 50-3 having the resonance frequencies f1 to f3 shown in FIG. 3 are shown in an upper part in FIG. 7. As shown in a middle part in FIG. 7, when a load is applied to coordinates P1 to P3 corresponding to the load detectors 50-1 to 50-3, the resonance frequencies f1 to f3 of the load detectors 50-1 to 50-3 change to resonance frequencies f1' to f3', which are higher frequencies, as indicated by arrows in a lower part in FIG. 7.

Here, a range in which the resonance frequency f1 of the load detector 50-1 can be changed is referred to as the resonance frequency change range FW1, a range in which the resonance frequency f2 of the load detector 50-2 can be changed is referred to as the resonance frequency change range FW2, and a range in which the resonance frequency f3 of the load detector 50-3 can be changed is referred to as the resonance frequency change range FW3.

In the example shown in FIG. 7, the opening widths W1 and W2 of the load detectors 50-1 and 50-2 are formed such that a difference between the resonance frequency f1 of the load detector 50-1 and the resonance frequency f2 of the load detector 50-2 is larger than a width of the resonance frequency change range FW1 of the load detector 50-1.

Similarly, the opening widths W2 and W3 of the load detectors 50-2 and 50-3 are formed such that a difference between the resonance frequency f2 of the load detector 50-2 and the resonance frequency f3 of the load detector 50-3 is larger than a width of the resonance frequency change range FW2 of the load detector 50-2.

According to such a configuration, the resonance frequency change ranges FW1 to FW3 of the load detectors 50-1 to 50-3 do not overlap each other.

Load Detection Method

Figure 8:
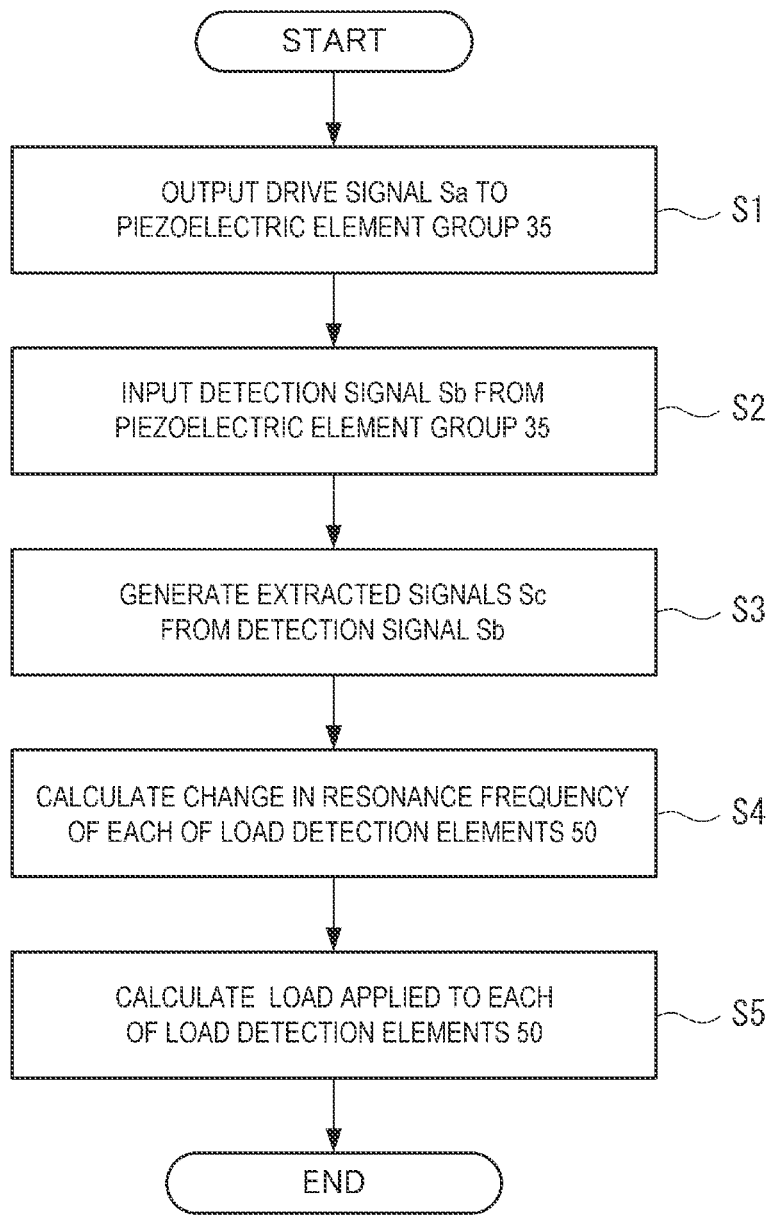
FIG. 8 is a flowchart illustrating a load detection method according to the first embodiment.

FIG. 8 is a flowchart showing a flow of a load detection method in the control device 60. The load detection method according to the present embodiment will be described with reference to FIG. 8 and the like.

In the following, for simplification of description, description is made using any one load detector group 51, and the same description can be applied to other load detector groups 51. In addition, in the following, processing when a load is applied to the piezoelectric element device 10 will be described.

First, under the control of the calculation unit 62, the drive circuit 612 outputs the drive signal Sa at a timing when the selection circuit 611 switches the coupling destination to the drive circuit 612 (step S1). The drive signal Sa is either a frequency sweep signal whose frequency is decreased or increased at a constant speed or an impulse signal including all frequencies, and is input to the piezoelectric element group 35 via the selection circuit 611.

A switching timing of the selection circuit 611 may be the same as a transmission and reception switching timing of an ultrasonic wave in an ultrasonic apparatus of the related art.

When the drive signal Sa is input to each of the piezoelectric elements 30, each of the load detectors 50-1 to 50-$n$ vibrates at a resonance frequency corresponding to the opening width and the load state of each of the load detectors 50-1 to 50-$n$. Accordingly, each piezoelectric element 30 outputs a voltage signal corresponding to a vibrating state, and the piezoelectric element group 35 outputs the detection signal Sb in which the voltage signal output from each piezoelectric element 30 is mixed.

Figure 9:
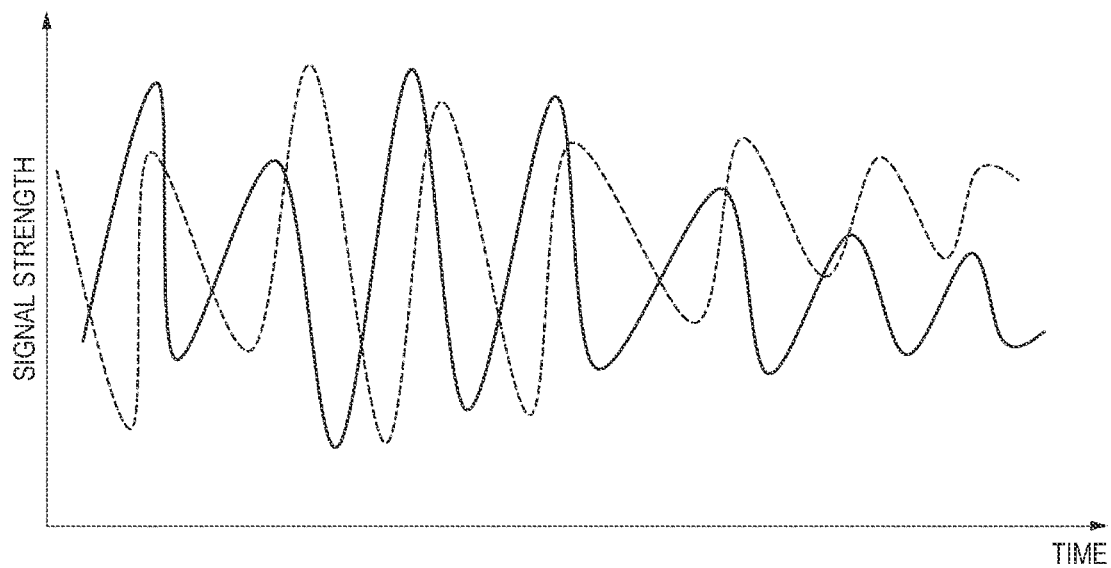
FIG. 9 is a graph showing a detection signal output from a piezoelectric element group according to the first embodiment.

FIG. 9 is a graph showing the detection signal Sb output from the piezoelectric element group 35. In FIG. 9, the detection signal Sb output from the piezoelectric element group 35 in the non-load state is indicated by a solid line, and the detection signal Sb output from any piezoelectric element group 35 in the load state is indicated by a dotted line.

Immediately after the output of the drive signal Sa, the selection circuit 611 switches the coupling destination from the drive circuit 612 to the detection circuit 613. As a result, the detection signal Sb is input to the detection circuit 613 from the piezoelectric element group 35 via the selection circuit 611 (step S2).

The detection circuit 613 selectively extracts, from the detection signal Sb input from the piezoelectric element group 35, a signal component contained in the resonance frequency change range of each of the load detectors 50-1 to 50-$n$, and outputs the signal component as each of the extracted signals Sc1 to Scn. That is, the detection circuit 613 generates a plurality of extracted signals Sc1 to Scn (step S3).

Figure 10:
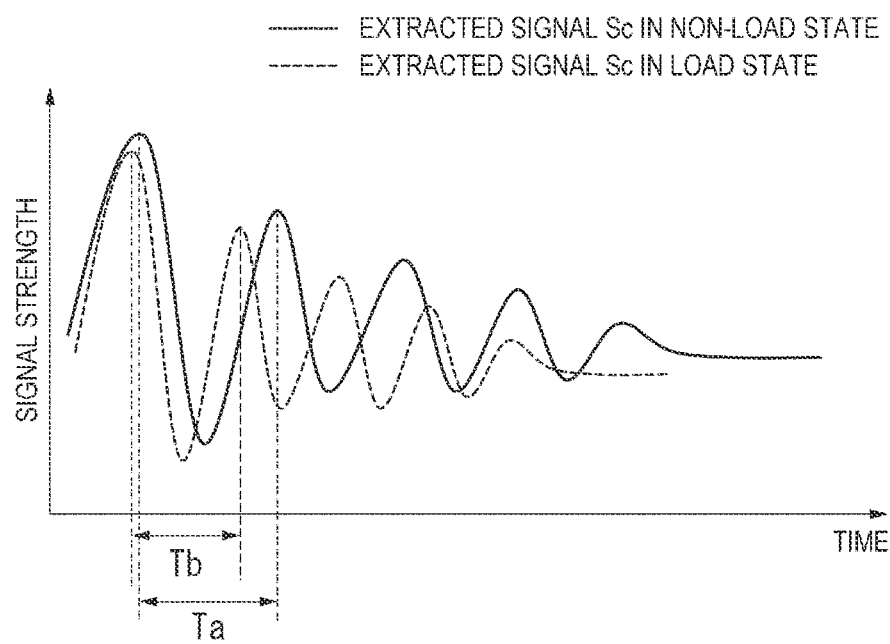
FIG. 10 is a graph showing one of a plurality of extracted signals according to the first embodiment.

FIG. 10 is a diagram showing any one of the plurality of extracted signals Sc1 to Scn.

In FIG. 10, the extracted signal Sc separated from the detection signal Sb in the non-load state is indicated by a solid line, and has a period Ta corresponding to the resonance frequency of the load detector 50 in the non-load state. The extracted signal Sc separated from the detection signal Sb in the load state is indicated by a dotted line, and has a period Tb corresponding to the resonance frequency of the load detector 50 changed by applying the load.

In the calculation unit 62, the change calculation unit 622 calculates a change in the resonance frequency of each of the load detectors 50-1 to 50-$n$ based on the period of each of the extracted signals Sc1 to Scn (step S4).

Specifically, the change calculation unit 622 calculates a difference between the period Ta in the non-load state and the period Tb in the load state for each of the extracted signals Sc1 to Scn, and calculates a ratio of the difference to the period Ta in the non-load state as the change rate of the resonance frequency.

The period Ta in the non-load state may be acquired at a start of an operation of the tactile sensor 1, or may be stored in advance in the storage unit 63.

Next, the load calculation unit 623 calculates the load applied to each of the load detectors 50-1 to 50-$n$ based on the change rate of each resonance frequency calculated by the change calculation unit 622 (step S5).

In the present embodiment, a table representing the relation between the change rate of the resonance frequency and the load for each of the load detectors 50-1 to 50-$n$ is stored in the storage unit 63, and the load calculation unit 623 can calculate the load by referring to the table.

As described above, the tactile sensor 1 according to the present embodiment can detect the load applied to each of the load detectors 50-1 to 50-$n$.

Thereafter, the calculation unit 62 may cause the display unit 64 to display a load distribution in the piezoelectric element device 10 based on the loads applied to the load detectors 50-1 to 50-$n$ and coordinate information on the load detectors 50-1 to 50-$n$.

A load applied to the other load detector groups 51 can also be detected by the same method as described above.

For example, the above-described method may be repeated every time the selection circuit 611 switches the piezoelectric element group 35 to be a coupling destination. When the detection circuit 613 has a configuration corresponding to each of the plurality of load detector groups 51, the detection circuit 613 may simultaneously detect the loads applied to the plurality of load detector groups 51.

Effects of First Embodiment

In the piezoelectric element device 10 according to the present embodiment, since the plurality of piezoelectric elements 30 disposed on the substrate 20 are coupled in parallel to each other, the plurality of piezoelectric elements 30 can be electrically coupled via a common wiring. Therefore, in the piezoelectric element device 10 according to the present embodiment, a ratio of the wiring to an area of the substrate 20 can be reduced, and the plurality of piezoelectric elements 30 can be disposed on the substrate 20 at a high density, as compared with a case where an individual wiring is coupled to the plurality of piezoelectric elements 30.

In the piezoelectric element device 10 according to the present embodiment, the load detector group 51 includes the plurality of piezoelectric elements 30 coupled in parallel to each other, and the load detectors 50 resonate at resonance frequencies different from each other. The resonance frequency changes in accordance with the load applied via the resin layer 40, and the resonance frequency change ranges, which are changeable ranges of the resonance frequencies, do not overlap each other between the load detectors 50 in the same load detector group 51.

According to such a configuration, even when the resonance frequency of a certain load detector 50 is changed by the load applied to the load detector 50, the resonance frequency after the change does not overlap the resonance frequency of another load detector 50. Therefore, by analyzing the detection signal Sb output from the piezoelectric element group 35, it is possible to detect the change in the resonance frequency of each load detector 50. As a result, the load applied to each load detector 50 can be detected.

Therefore, the tactile sensor 1 using the piezoelectric element device 10 according to the present embodiment can detect the load applied to the piezoelectric element device 10 with high resolution by the piezoelectric elements 30 disposed at a high density.

The tactile sensor 1 according to the present embodiment includes the piezoelectric element device 10, and the resonance frequency detector 624 that detects the change in the resonance frequency for each load detector 50 based on the detection signal Sb output from the piezoelectric element group 35 by the vibration of each load detector 50.

Since such a tactile sensor 1 includes the piezoelectric element device 10, the same effects as those described above are achieved.

In the tactile sensor 1 according to the present embodiment, the resonance frequency detector 624 includes the plurality of band-pass filters BPF1 to BPFn that are provided corresponding to the load detectors 50 and selectively extract as the extracted signals Sc1 to Scn, from the detection signal Sb, the signal component contained in the resonance frequency change range of the corresponding load detector 50, and the change calculation unit 622 that calculates the change in the resonance frequency of each load detector 50 based on the period of the extracted signals Sc1 to Scn extracted by the band-pass filters BPF1 to BPFn.

In such a configuration, since the change in the resonance frequency of each load detector 50 can be calculated without performing high-load Fourier transform, it is possible to shorten a time required for detecting the load.

The tactile sensor 1 according to the present embodiment further includes the drive circuit 612 that inputs to the piezoelectric element group 35 the drive signal Sa for causing the plurality of load detectors 50 to vibrate.

In such a configuration, even when the object to be detected remains in contact with the resin layer 40, each load detector 50 can be vibrated, and the change in the resonance frequency of each load detector 50 can be detected.

The tactile sensor 1 according to the present embodiment further includes the load calculation unit 623 that calculates the load applied to each load detector 50 based on the change in the resonance frequency of each load detector 50 detected by the resonance frequency detector 624.

In the present embodiment, the distribution of the load applied to the piezoelectric element device 10 can be detected with high resolution.

Such a tactile sensor 1 according to the present embodiment can be suitably used as a tool for quantifying, for example, a delicate sense of force of a craftsman and transmitting the delicate sense to a non-experienced person or the like.

Second Embodiment

Hereinafter, a second embodiment of the present disclosure will be described. The same components as those of the first embodiment are denoted by the same reference numerals as those of the first embodiment, and the description thereof may be omitted.

Figure 11:
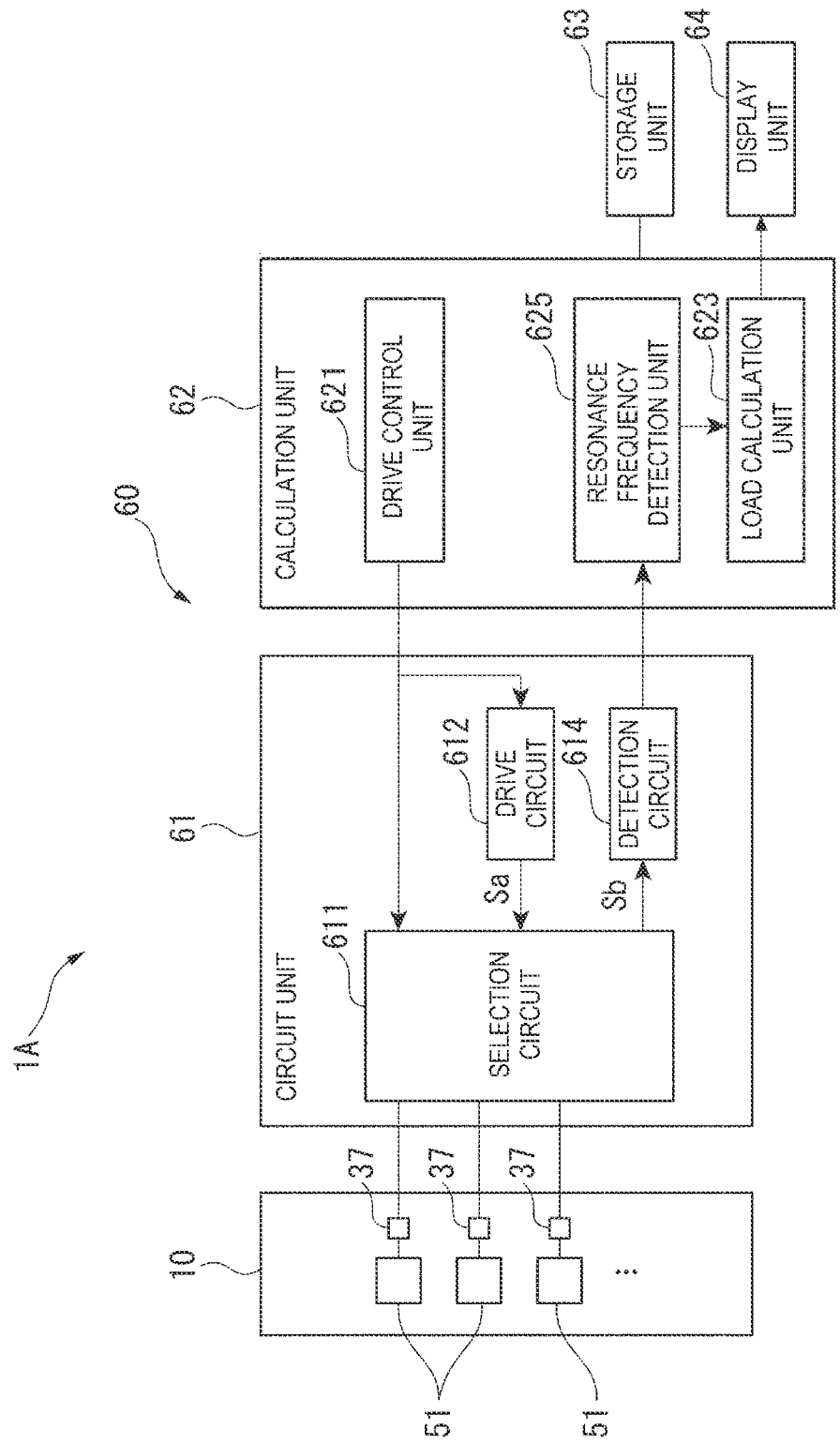
FIG. 11 is a block diagram showing a schematic configuration of a tactile sensor according to a second embodiment.

As shown in FIG. 11, a tactile sensor 1A according to the second embodiment includes basically the same configuration as the tactile sensor 1 according to the first embodiment. It is noted that, a detection circuit 614 according to the second embodiment does not have to include the bandpass filter as described in the first embodiment, and may include an A/D converter that performs analog-to-digital conversion or various circuits that perform signal processing, such as removal of noise components and amplification to a desired signal level, on the detection signal Sb.

In addition, in the second embodiment, a resonance frequency detector 625 calculates a change in a resonance frequency of each load detector 50 by analyzing, using Fourier transform, a signal component in a frequency change range corresponding to each load detector 50 and contained in the detection signal Sb.

Figure 12:
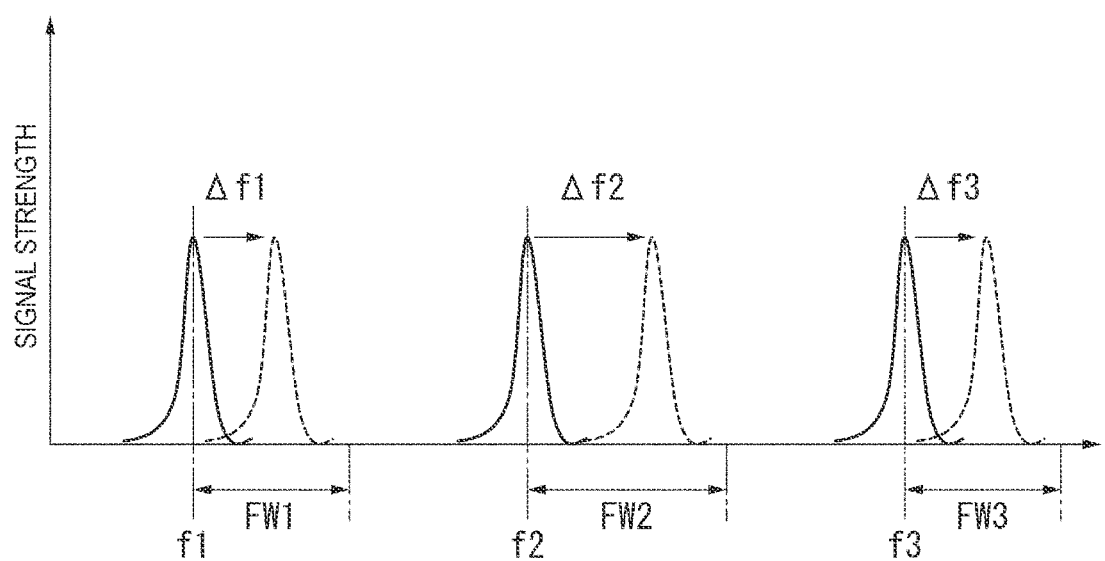
FIG. 12 is a graph showing a waveform obtained by performing Fourier transform on a detection signal output from a piezoelectric element group according to the second embodiment.

Specifically, the resonance frequency detector 625 generates a frequency spectrum representing an amplitude change with respect to a frequency as shown in FIG. 12 by performing Fourier transform on the detection signal Sb representing an amplitude change with respect to a time as shown in FIG. 9.

In FIG. 12, the frequency spectrum obtained by performing Fourier transform on the detection signal Sb corresponding to a non-load state is indicated by a solid line, and a frequency spectrum obtained by performing Fourier transform on the detection signal Sb corresponding to a load state is indicated by a dotted line. FIG. 12 shows a change in the resonance frequencies f1 to f3 of any three load detectors 50-1 to 50-3 shown in FIG. 3.

Next, based on the generated frequency spectrum, the resonance frequency detector 625 detects a difference between the resonance frequency of each load detector 50 to which a load is applied and the resonance frequency of each load detector 50 in the non-load state, that is, a change amount of the resonance frequency of each load detector 50 (change amounts Δf1 to Δf3 of the resonance frequencies f1 to f3 shown in FIG. 12). Then, the resonance frequency detector 625 calculates a change rate of the resonance frequency of each load detector 50 based on the detected change amount of the resonance frequency of each load detector 50.

The resonance frequency of each load detector 50 in the non-load state may be acquired at a start of an operation of the tactile sensor 1, or may be stored in advance in the storage unit 63.

Thereafter, the load calculation unit 623 calculates the load applied to each load detector 50 based on the change rate of the resonance frequency of each load detector 50 calculated by the resonance frequency detector 625, as in the above-described embodiment.

In the second embodiment, a structure of the detection circuit 614 can be more simplified as compared with the first embodiment.

Modification

The present disclosure is not limited to the embodiments described above, and configurations obtained through modifications, alterations, and appropriate combinations of the embodiments within a scope of being capable of achieving the object of the present disclosure are included in the present disclosure.

First Modification

In the above embodiments, the substrate 20 includes the substrate main body 21 and the vibrating plate 22, and a portion of the vibrating plate 22 that closes the opening 210 of the substrate main body 21 serves as the vibrating portion 23. Other configurations may be used. For example, etching may be performed on the substrate 20, and a thinner portion of the substrate 20 may be used as the vibrating portion 23.

Second Modification

In the above-described embodiments, the resonance frequency and the resonance frequency change range of the load detector 50 are set depend on the opening width of the opening 210, that is, a dimension of the vibrating portion 23 for each load detector 50 in the load detector group 51, but may be set depend on other configurations.

For example, the resonance frequency of the load detector 50 may be adjusted depend on a thickness of the piezoelectric element 30, or may be adjusted depend on flexural rigidity of the vibrating portion 23. The flexural rigidity of the vibrating portion 23 can be adjusted by performing etching or the like on the vibrating plate 22.

Third Modification

In the embodiments described above, the tactile sensor 1 which is one form of a piezoelectric element apparatus has been described, but the piezoelectric element apparatus according to the present disclosure may be configured as another sensor which calculates a physical quantity other than the load by detecting the change in the resonance frequency without including the load calculation unit which calculates the load applied to the load detector. For example, by vibrating the load detector, an ultrasonic wave is generated in a resin, and a hardness of the resin can be calculated based on a propagation time and the load.

Overview of Present Disclosure

The present disclosure will be summarized as follows.

According to an aspect of the present disclosure, a piezoelectric element device includes: a substrate including a plurality of vibrating portions; a piezoelectric element group in which piezoelectric elements provided in the plurality of vibrating portions are coupled in parallel to each other; and a resin layer covering the piezoelectric element group, in which load detectors individually including a vibrating portion and a piezoelectric element provided in the vibrating portion resonate at resonance frequencies different from each other, the resonance frequency of the load detector changes in accordance with a load applied to the load detector via the resin layer, and resonance frequency change ranges, which are changeable ranges of the resonance frequencies, do not overlap each other.

In the present aspect, since the plurality of piezoelectric elements disposed on the substrate are coupled in parallel to each other, the plurality of piezoelectric elements can be electrically coupled via a common wiring. Therefore, in the piezoelectric element device according to the present aspect, a ratio of the wiring to an area of the substrate can be reduced, and the plurality of piezoelectric elements can be disposed on the substrate at a high density, as compared with a case where an individual wiring is coupled to the plurality of piezoelectric elements.

In addition, in the present aspect, even when the resonance frequency of a certain load detector is changed by the load applied to the load detector, the resonance frequency after the change does not overlap the resonance frequency of another load detector. Therefore, by analyzing the signal output from the piezoelectric element group, it is possible to detect the change in the resonance frequency of each load detector. As a result, the load applied to each load detector can be detected.

Therefore, the piezoelectric element apparatus using the piezoelectric element device according to the present aspect can detect the load applied to the piezoelectric element device or a physical quantity corresponding to the load with high resolution by the piezoelectric elements disposed at a high density.

A piezoelectric element apparatus according to the present aspect includes: the piezoelectric element device described above; and a resonance frequency detector configured to detect a change in the resonance frequency for the load detector based on a detection signal output from the piezoelectric element group due to vibration of the load detectors.

The piezoelectric element apparatus according to the present aspect includes the piezoelectric element device, and thus the same effects as those described above are achieved.

In the piezoelectric element apparatus according to the present aspect, the resonance frequency detector may include: a plurality of bandpass filters provided corresponding to the load detectors and individually configured to selectively extract, as an extracted signal, from the detection signal, a signal component contained in the resonance frequency change range of the corresponding load detector; and a change calculation unit configured to calculate a change in the resonance frequency for the load detector based on a period of the extracted signal extracted by the bandpass filter.

In the present aspect, since the change in the resonance frequency of each load detector can be calculated without performing high-load Fourier transform, it is possible to shorten a time required for detecting the physical quantity corresponding to the load.

In the piezoelectric element apparatus according to the present aspect, the resonance frequency detector may calculate the change in the resonance frequency for the load detector by analyzing, using Fourier transform, a signal component in the resonance frequency change range corresponding to the load detector and contained in the detection signal.

In the present aspect, a circuit structure constituting the resonance frequency detector can be simplified.

The piezoelectric element apparatus according to the present aspect may further include a drive circuit configured to input to the piezoelectric element group a drive signal for causing the load detectors to vibrate.

In the present aspect, even when an object to be detected remains in contact with the resin layer, each load detector can be vibrated, and the change in the resonance frequency of each load detector can be detected.

The piezoelectric element apparatus according to the present aspect may further include a load calculation unit configured to calculate, based on the change in the resonance frequency for the load detector detected by the resonance frequency detector, the load applied to the load detector.

In the present aspect, a distribution of the load applied to the piezoelectric element device can be detected with high resolution.

A load detection method according to present aspect includes: by using a piezoelectric element device including a substrate including a plurality of vibrating portions, a piezoelectric element group in which piezoelectric elements provided in the plurality of vibrating portions are coupled in parallel to each other, and a resin layer covering the piezoelectric element group, in which load detectors individually including a vibrating portion and a piezoelectric element provided in the vibrating portion resonate at resonance frequencies different from each other, the resonance frequency of the load detector changes in accordance with a load applied to the load detectors via the resin layer, and resonance frequency change ranges, which are changeable ranges of the resonance frequencies, do not overlap each other, a resonance frequency detection step of detecting a change in the resonance frequency for the load detector based on a detection signal output from the piezoelectric element group due to vibration of the load detector; and a load calculation step of calculating the load applied to the load detector based on the change in the resonance frequency for the load detector detected in the resonance frequency detection step.

The load detection method according to the present aspect achieves the same effects as those described above by using the piezoelectric element device described above.

What is claimed is:

1. A piezoelectric element device, comprising:
   a substrate including a plurality of vibrating portions having a first vibrating portion and a second vibrating portion;
   a piezoelectric element group in which a plurality of piezoelectric elements having a first piezoelectric element and a second piezoelectric element provided in the plurality of vibrating portions are coupled in parallel to each other;
   a plurality of load detectors having a first load detector including the first vibrating portion and the first piezoelectric element provided in the first vibrating portion and a second load detector including the second vibrating portion and the second piezoelectric element provided in the second vibrating portion; and
   a resin layer covering the piezoelectric element group, wherein
      the first load detector resonates at a first resonance frequency,
      the second load detector resonates at a second resonance frequency,
      the first resonance frequency and the second resonance frequency are different from each other,
      the first resonance frequency changes in accordance with a load applied to the first load detector via the resin layer,
      the second resonance frequency changes in accordance with a load applied to the second load detector via the resin layer, and a first resonance frequency change range, which is a changeable range of the first resonance frequency, and a second resonance frequency change range, which is a changeable range of the second resonance frequency, do not overlap each other.

2. A piezoelectric element apparatus, comprising:
the piezoelectric element device according to claim 1; and
a resonance frequency detector configured to detect a change in a resonance frequency for each of the plurality of load detectors based on a detection signal output from the piezoelectric element group due to vibration of the plurality of load detectors.

3. The piezoelectric element apparatus according to claim 2, wherein
the resonance frequency detector includes a plurality of bandpass filters provided corresponding to the plurality of load detectors and individually configured to selectively extract as an extracted signal, from the detection signal, a signal component contained in a resonance frequency change range of a corresponding load detector of the plurality of load detectors, and
a change calculation unit configured to calculate the change in the resonance frequency for each of the plurality of load detectors based on a period of the extracted signal extracted by each of the plurality of bandpass filters.

4. The piezoelectric element apparatus according to claim 2, wherein the resonance frequency detector calculates the change in the resonance frequency for each of the plurality of load detectors by analyzing, using Fourier transform, a signal component in a resonance frequency change range corresponding to each of the plurality of load detectors and contained in the detection signal.

5. The piezoelectric element apparatus according to claim 2, further comprising:
a drive circuit configured to input to the piezoelectric element group a drive signal for causing the plurality of load detectors to vibrate.

6. The piezoelectric element apparatus according to claim 2, further comprising:
a processor programmed to calculate, based on the change in the resonance frequency for each of the plurality of load detectors detected by the resonance frequency detector, the load applied to each of the plurality of load detectors.

7. A load detection method, comprising:
a piezoelectric element device including a substrate including a plurality of vibrating portions, a piezoelectric element group in which piezoelectric elements provided in the plurality of vibrating portions are coupled in parallel to each other, and a resin layer covering the piezoelectric element group, in which load detectors individually including a vibrating portion and a piezoelectric element provided in the vibrating portion resonate at resonance frequencies different from each other, the resonance frequencies of the load detectors change in accordance with a load applied to the load detectors via the resin layer, and resonance frequency change ranges, which are changeable ranges of the resonance frequencies, do not overlap each other,
detecting a change in a resonance frequency for each of the load detectors based on a detection signal output from the piezoelectric element group due to vibration of the load detectors; and
calculating, based on the change in the resonance frequency for each of the load detectors, the load applied to the load detectors.

\* \* \* \* \*